United States Patent Office 3,473,592
Patented Oct. 21, 1969

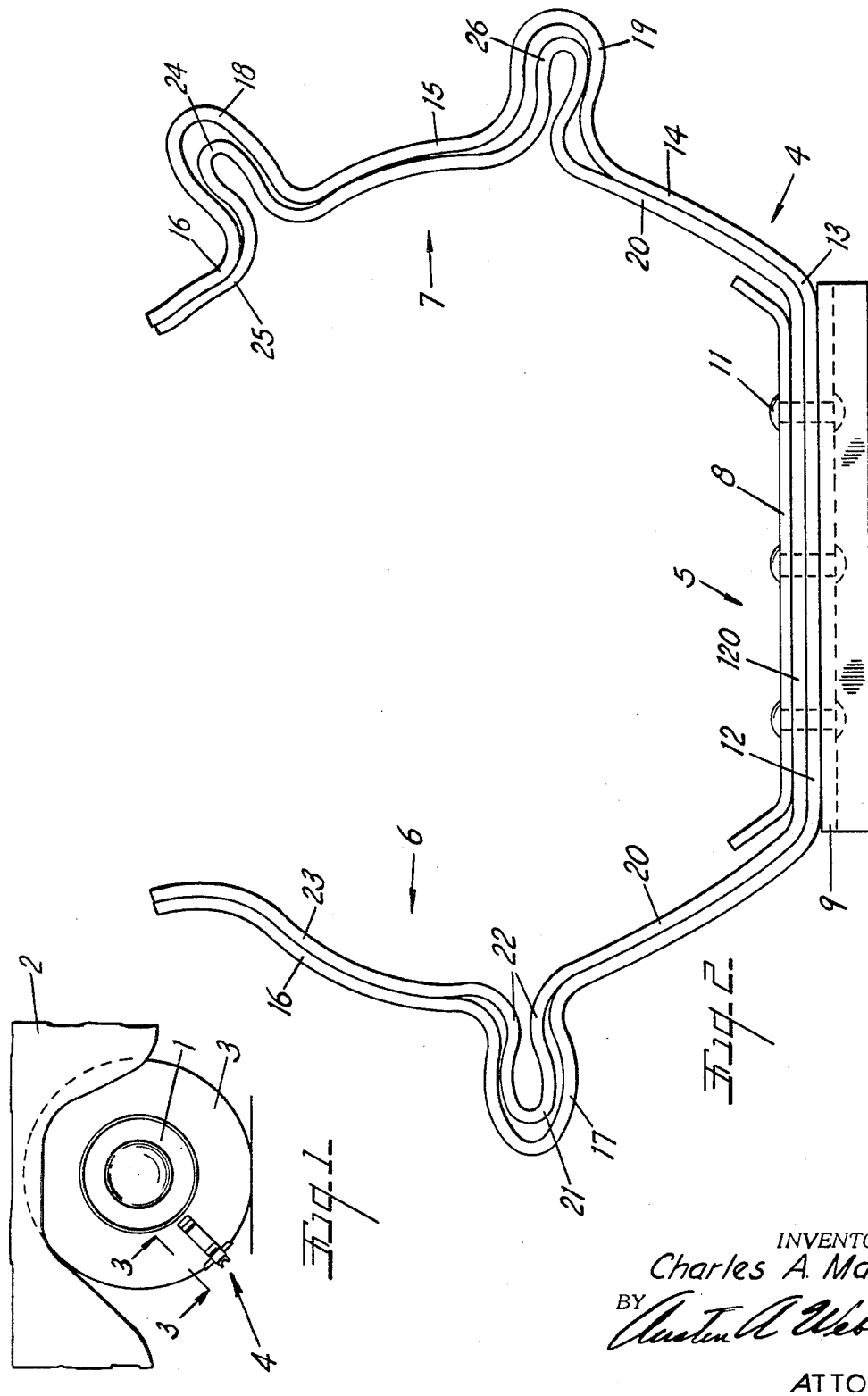

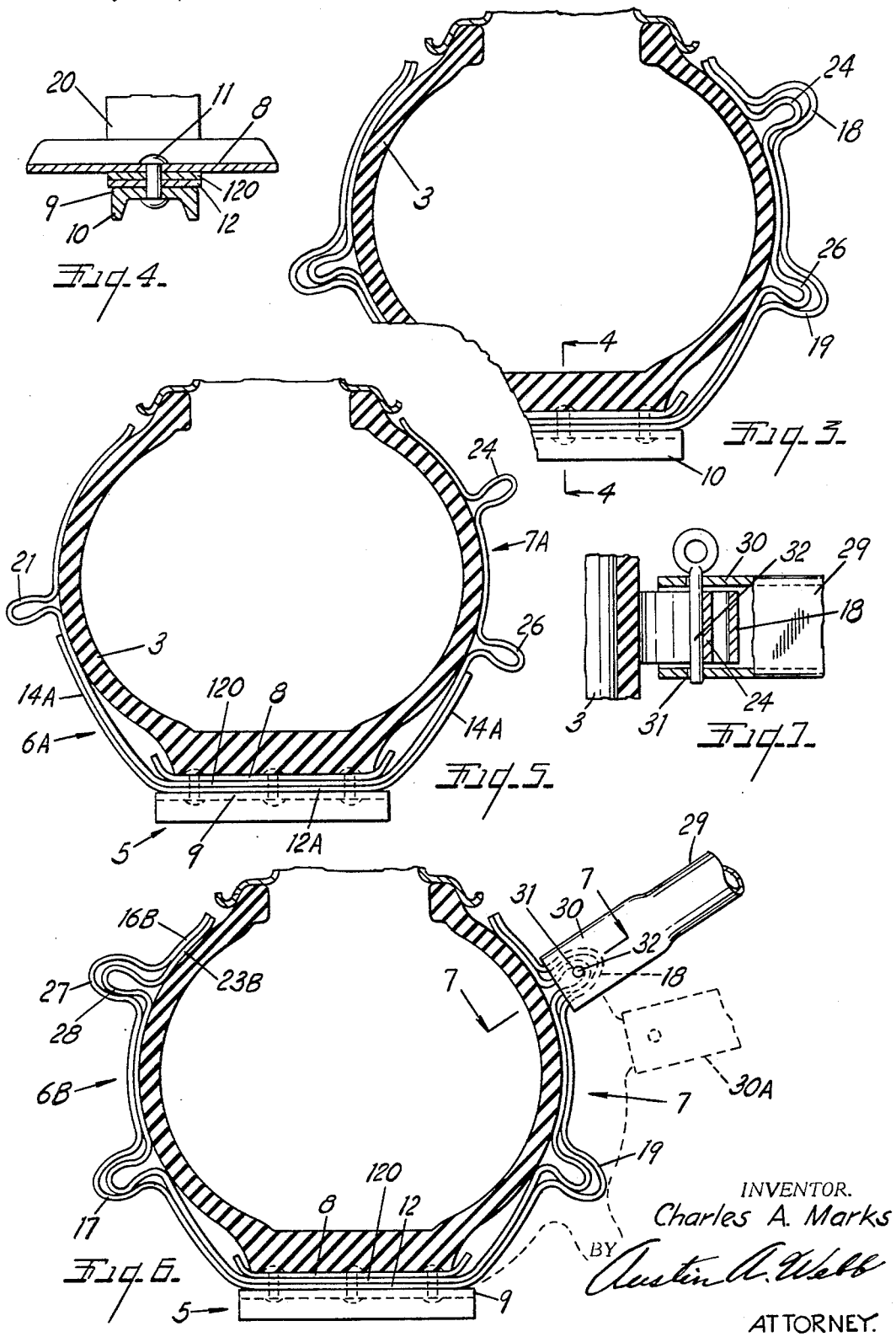

3,473,592
EMERGENCY TRACTION CLEAT FOR TIRES
Charles A. Marks, 1541 S. Main St.,
Elkhart, Ind. 46514
Filed Sept. 22, 1966, Ser. No. 581,224
Int. Cl. B60c 27/04
U.S. Cl. 152—213                    9 Claims

ABSTRACT OF THE DISCLOSURE

A flat tread engaging base, a road engaging cleat on the bottom of the base, a U-shaped springable metal strip secured between the base and the cleat, with concavely bowed side arms embracing the sides of a tire, and one or more outwardly and reversely turned loops formed in the side arms in spaced relation between the ends of the arms and the base.

Modifications show clamps with plural lapped strips, with some strips having reversely turned loops in the inner strip located in spaced relation in loops in the outer strips.

OUTLINE OF INVENTION

The outwardly projecting, reversely bent loops in the side arms of the U-shaped clamps provided localized lines or points of greater resistance to bending than the adjacent portions of the concave arms. Oppositely inward gripping pressure of the arms against the tire may be increased, while lesser localized outward spreading force applied to the end of an arm, to spread and remove the clamp can act in the looped portions as well as the remainder of the arms. The loops may also be used as anchors for applying tools.

Other objects and advantages of the invention will be apparent from a consideration of the following description and claims. The drawings, of which there are two sheets, illustrate three highly practical forms of the cleat.

FIGURE 1 is a fragmentary side elevational view of the outer side of a vehicle wheel and tire with one form of the cleat of the invention applied thereto.

FIGURE 2 is an enlarged end elevational view of the cleat shown in FIGURE 1.

FIGURE 3 is a fragmentary cross sectional view taken radially through the tire as indicated at 3—3 in FIGURE 1 and illustrating the cleat in end elevation as applied to the tire.

FIGURE 4 is a fragmentary cross sectional view through the lower traction portion of the cleat taken along the plane of the line 4—4 in FIGURE 3.

FIGURE 5 is a view similar to FIGURE 3 showing a first modified form of the cleat.

FIGURE 6 is a view similar to FIGURES 3 and 5 showing a second modified form of the cleat, and showing a tool applied to the cleat for applying and removing the cleat from the tire.

FIGURE 7 is a fragmentary cross sectional view taken along the plane of the line 7—7 in FIGURE 6 and showing the relationship between the cleat and the removing and applying tool.

FIGURE 1 illustrates a driving wheel 1 of a vehicle 2 having the familiar form of pneumatic tire 3 mounted on the wheel. The cleat of the invention is generally indicated at 4.

As appears more clearly in FIGURE 2 the cleat of the invention comprises a straight lower base strip generally indicated at 5 with side arms 6 and 7 extending laterally outwardly and upwardly therefrom. The arms 6 and 7 are formed of relatively narrow elongated strips of spring steel as will be described in greater detail presently. Attached to the upper side of the base strip 5 is a tread plate 8 which is wider than the strip material of the arms and which projects substantially to the front and rear thereof as appears in FIGURE 4. Secured to the bottom side of the tread engaging portion of the cleat is a traction bar 9 which in the form illustrated consists of a relatively stiff metal channel having flanges 10, the edges of which engage the surface of the road. Rivets 11 or other fastening means secure the tread plate and the traction bar to opposite sides of the base portion of the cleat.

More specifically the strips of spring steel from which the base strip and said arms are formed are continuous integral strips having base portions 12 connected at their ends by upward and outward bends 13 to upwardly and laterally outwardly extending lower portions 14. The arms 7 are oppositely inwardly concave with central portions 15 of maximum lateral extension and upper portions 16 that converge laterally inwardly over the top of the bulged cross section of the tire.

Intermediate of its ends the left side arm 6 which is commonly disposed on the inner side of the tire has a laterally outwardly projecting integral loop 17 formed therein. The right or outer arm has an outwardly and upwardly projecting loop 18 formed therein in the laterally inwardly inclined upper portion 16 of the strip while a second outwardly projecting loop 19 is formed in the lower portion of the side arm adjacent the junction between the outwardly projecting lower portion 14 and the central portion 15 of the arm.

In the first form of the cleat the base portion and side arms are formed by overlapping strips of spring steel which coact and stiffen each other to more tightly grip the tire. The inner strip has a straight base portion 120 with laterally outwardly and upwardly inclined lower portions 20 at its ends in lapped engagement with the corresponding outwardly inclined portions 14 of the outer strip. The inner strip has a loop 21 formed therein which lies within the loop 17 in the inner or left arm and which is smaller and tighter than the loop 17, having reentrant curved portions 22 at the base of the loop which are spaced from the corresponding upper and lower sides of the loop 17 in the outer strip. Above the loop 21 the inner strip has an outwardly and inwardly inclined concave upper portion 23 that is in lapped engagement with the upper portion 16 of the left arm.

Similarly the right or outer portion of the inner strip has a loop 24 formed near its upper end which is positioned within and spaced from the loop 18 in the outer strip. The loop 24 is formed in the upwardly and inwardly inclined portion 25 of the inner strip. A third loop 26 is formed in the outwardly inclined portion 20 and lies within the loop 19 in the outer strip.

It will be noted that the loops 17–21, 18–24 and 19–26 form sections of the springable side arms which are highly resistant to expanding forces applied to their inner sides by bulging or expanding forces of the tire but which are of relatively reduced resistance to outward angular or prying forces as will be described presently. In effect the several loops increase the effective length of the strips considered as springs and increase their flexibility to bending in one direction without correspondently increasing their flexibility or resistance to bending in the opposite direction.

FIGURE 5 illustrates a modified form of the cleat having the same base strip or portion 5, tread plate 8 and traction bar 9 of the first form of the cleat. However the left or inner arm 6A and right or outer arm 7A are modified in that the outer strip 12A extends only part way along the arms as at 14A. The inner strip 120 is essentially the same as the corresponding strip in FIGURES 2 and 3 having a loop 21 formed in its inner side portion and loops 24 and 26 formed in its right or outer portion.

The modified form of cleat shown in FIGURE 6 has the same base strip or portion 5 as the other forms of the cleat with a tread plate 8 and traction bar 9 secured to opposite sides of overlapped lower or outer strip 12 and upper or inner strip 120. The strips forming the arms have the same loops 17, 18 and 19 formed therein. The principal difference from the other forms of the cleat is the provision of a second or additional loop 27 in the upwardly and inwardly inclined upper portion 16A of the outer strip and a second loop 28 in the corresponding portion 23A of the inner strip of the left or inner arm 6B.

The loops 18–24, in addition to forming points of localized resistance to outward pressure form laterally outwardly extending projections on the outer side arms which are readily engageable by a tool such as the bar 29 shown in FIGURES 6 and 7. The bar has an end portion 30 of rectangular cross section with holes 31 formed in opposite sides thereof to receive the removable pin 32. When the square section of the tool is placed over the projecting loops 18 and 24 the pin 31 can be passed through the inner loop 24 so that movement of the tool 29 in a direction downwardly or radially outwardly relative to the tire causes the pin 32 to pull outwardly on the side of the loop 24 while the lower edge of the square section 30 of the tool abuts the outer strip below the outer loop 18. This action bends the arm 7 angularly outwardly away from the side of the tire as is indicated by the dotted position 30A of the tool in FIGURE 6. The force applied by the tool is angularly outward or tangential to the cross section of the tire and functions to open or widen the loops in the side arms so that the upper converged ends of the arms are spread sufficiently to remove the cleat from the tire. When installing the cleat the operation of the tool is generally opposite in that the upper end 16–23 or 16A–23A of the cleats are hooked over the back or inner side of the tire and a combined angular twisting motion and pushing motion is applied with the tool 29 to open the arms of the cleat and push the outer arm radially inwardly of the wheel and over the maximum diameter of the cross section of the tire.

Other forms of attaching and removing tools and coacting engaging portions of the side arm of the cleat may be substituted for the loops 18 and 24 but the use of the tool and loops as illustrated permits the loops to function both as a tool engaging portion and a point of reduced resistance to outward flexing of the side arm 7 in applying or removing the cleat.

All forms of the cleat illustrated function on essentially the same principal and the force with which the springable arms engage the sides of the tire may be varied by changing the stiffness and thickness of the strip material as will be understood. It should be pointed out that the tread plate 8 coacts with the springable engagement between the side arms and the sides of the tire to hold the cleat in place by engaging a broad portion of the tread of the tire and resisting the tendency of the reaction forces between the traction bar and the road surface during rotation of the tire and cleat from twisting the side arms of the cleat from their radially extending positions relative to the axis of the wheel.

What is claimed as new is:

1. An emergency traction cleat for tires comprising a base strip adapted to lie in transverse crossing relation to the tread of a tire,
    a tread plate connected to said base strip and extending beyond the sides thereof in tangential relation to the tread of a tire, and
    side arms of springable metal extending upwardly from said base strip and having integral and bendable angled connections to the ends of said base strip,
    said side arms extending in oppositely inwardly concave relation from outwardly extending portions adjacent to said angled connections to inwardly extending upper portions that are inwardly curved, and
    at least one outwardly projecting reversely bent loop with spaced upper and lower sides formed in each of said side arms,
    said loops being spaced from the free ends of said arms.

2. A cleat as defined in claim 1 in which said tread plate is a separate plate secured to the top of said base strip, and
    a traction bar secured to the bottom of said base strip.

3. A cleat as defined in claim 2 in which said base strip and said side arms are formed in a continuous integral strip of spring steel.

4. A cleat as defined in claim 3 in which the outwardly projecting loop in one side arm is located on the upper, inwardly extending portion of the arm.

5. A cleat as defined in claim 4 in which said one side arm has a second outwardly projecting loop formed in the lower, outwardly projecting portion of the arms.

6. A cleat as defined in claim 4 in which said base strip and said side arms are formed of a plurality of lapped strips of spring steel,
    the outwardly projecting loops in the outer strip being larger than the loops in the inner strip,
    the loops in the inner strip having reentrant portions forming enlarged heads engageable with the lower sides of the loops in the outer strip in outwardly spaced relation to the inner ends of the outer loops.

7. A cleat as defined in claim 5 in which said base strip and said side arms are formed of a plurality of lapped strips of spring steel,
    the outwardly projecting loops in the outer strip being larger than the loops in the inner strip,
    the loops in the inner strip having reentrant portions forming enlarged heads engageable with the lower sides of the loops in the outer strip in outwardly spaced relation to the inner ends of the outer loops.

8. A cleat as defined in claim 3 in which there is a lower backing strip of spring steel secured in lapped relation to said base strip, and
    integral ends on said backing strip extending in lapped relation to the lower portions of said side arms and terminating below the loops therein.

9. An emergency traction cleat for tires comprising a tread plate adapted to lie in transverse crossing relation to the tread and tangential relation to the periphery of a tire, and
    side arms of springable metal fixedly secured to and extending from the transverse ends of said tread plate,
    said side arms extending in oppositely inwardly concave relation from outwardly extending portions adjacent to the ends of said tread plate to inwardly extending upper portions that are inwardly curved,
    said side arms having plural projections from the outer sides of the general line of curvature of the arms and at spaced positions therealong,
    said projections extending transversely of the length of the arms and forming areas of increased resistance to flexing as compared with the portions of the arms at each side of the projections,
    a pair of said offsets being located one on each of said inwardly extending upper portions of the arms in substantially spaced relation below the upper ends of the arms.

References Cited

UNITED STATES PATENTS

| | | | |
|---|---|---|---|
| 1,477,983 | 12/1923 | Stokes | 152—225 |
| 2,330,839 | 10/1943 | O'Brien | 152—233 |
| 2,871,903 | 2/1959 | Minutilla | 152—226 |
| 3,205,930 | 9/1965 | Katz | 152—226 |

FOREIGN PATENTS 803,638   4/1951   Germany.

ARTHUR L. LA POINT, Primary Examiner

C. B. LYON, Assistant Examiner

U.S. Cl. X.R.

152—225, 233